United States Patent
Montalbano et al.

(10) Patent No.: US 12,179,742 B2
(45) Date of Patent: Dec. 31, 2024

(54) METHOD AND APPARATUS FOR CONTROLLING VEHICLE STABILITY

(71) Applicant: HYUNDAI MOBIS CO., LTD., Seoul (KR)

(72) Inventors: Flavio Montalbano, Bad Vilbel (DE); Lorenzo Pinto, Frankfurt am Main (DE)

(73) Assignee: Hyundai Mobis Co., Ltd., Seoul (KR)

( * ) Notice: Subject to any disclaimer, the term of this patent is extended or adjusted under 35 U.S.C. 154(b) by 247 days.

(21) Appl. No.: 17/964,159

(22) Filed: Oct. 12, 2022

(65) Prior Publication Data

US 2023/0347875 A1 Nov. 2, 2023

(30) Foreign Application Priority Data

Apr. 29, 2022 (DE) .......................... 102022204246.8

(51) Int. Cl.
| | |
|---|---|
| *B60W 30/045* | (2012.01) |
| *B60W 10/04* | (2006.01) |
| *B60W 10/184* | (2012.01) |
| *B60W 30/18* | (2012.01) |
| *B60W 40/068* | (2012.01) |
| *B60W 40/101* | (2012.01) |
| *B60W 40/103* | (2012.01) |

(52) U.S. Cl.
CPC .......... *B60W 30/045* (2013.01); *B60W 10/04* (2013.01); *B60W 10/184* (2013.01); *B60W 30/18172* (2013.01); *B60W 40/068* (2013.01); *B60W 40/101* (2013.01); *B60W 40/103* (2013.01); *B60W 2510/20* (2013.01); *B60W 2520/125* (2013.01); *B60W 2520/14* (2013.01); *B60W 2520/20* (2013.01)

(58) Field of Classification Search
CPC .... B60W 10/04; B60W 10/184; B60W 10/20; B60W 30/02; B60W 30/045; B60W 30/18145; B60W 30/18172; B60W 40/068; B60W 40/101; B60W 40/103; B60W 40/114; B60W 2510/20; B60W 2520/125; B60W 2520/14; B60W 2520/20; B60W 2520/26; B60W 2520/28; B60W 2540/18; B60W 2552/40; B60W 2720/14; G05D 1/0061; G05D 1/0088; G05D 1/021; G05D 1/0214; G05D 1/0221; G05D 1/0223; B60K 28/00–165
See application file for complete search history.

(56) References Cited

U.S. PATENT DOCUMENTS

| | | | | |
|---|---|---|---|---|
| 8,244,432 | B2 * | 8/2012 | Kogure | B60W 40/068 180/197 |
| 10,065,636 | B2 * | 9/2018 | Varnhagen | B60W 10/06 |
| 2020/0216085 | A1 * | 7/2020 | Bobier-Tiu | B60W 40/08 |
| 2023/0311852 | A1 * | 10/2023 | Pinto | B60W 10/04 701/41 |

* cited by examiner

*Primary Examiner* — Hung Q Nguyen
*Assistant Examiner* — Mark L. Greene
(74) *Attorney, Agent, or Firm* — NSIP Law

(57) ABSTRACT

A vehicle stability control method includes collecting steering information from a sensor of a vehicle, calculating a saturation index of a front axle of the vehicle or a rear axle of the vehicle using the steering information, and controlling an application of the vehicle based on the saturation index.

10 Claims, 9 Drawing Sheets

METHOD AND APPARATUS FOR CONTROLLING VEHICLE STABILITY

CROSS-REFERENCE TO RELATED APPLICATION

This application claims priority to and the benefit of German Patent Application No. 10 2022 204 246.8 filed on Apr. 29, 2022, the entire disclosure of which is incorporated herein by reference in its entirety.

BACKGROUND OF THE DISCLOSURE

Field of the Disclosure

The present disclosure in some embodiments relates to a vehicle stability control method and a vehicle stability control apparatus.

Related Art

The statements in this section merely provide background information related to the present disclosure and do not necessarily constitute prior art.

Applications for assisting the driving of vehicles are evolving. Rear Wheel Steering (RWS) is an application that controls a steering angle of a rear wheel in response to a steering angle of a front wheel. An Electronic Stability Control (ESC) is an application that controls an attitude of a vehicle by distributing a braking force to wheels. The conventional RWS has a problem of reducing vehicle stability due to erroneous or excessive intervention. In addition, the RWS has a problem of interfering with a normal operation of the ESC.

In vehicle dynamics, various methods are used to estimate lateral stability or vehicle stability. A well-known method for estimating lateral stability is a phase plane method. The phase plane method estimates vehicle stability based on a quadrant position using a phase plane of a physical quantity. The physical quantity used by the phase plane method may be side-slip, a side-slip velocity, a yaw rate, a yaw acceleration, or a combination thereof. The phase plane method is particularly useful for determining vehicle slippage. The vehicle slippage means loss of a lateral grip of the rear axle. The method based on a yaw rate error and a method for a result of the yaw rate error are widely used to determine understeer and understeer tendency of road vehicles as well as oversteer. For example, results of yaw speed errors include effective steering angle errors and corner speed targets.

The Active Yaw Control (AYC) is also referred to as torque vectoring and is an application that distributes driving force to tires to assist the turning of a vehicle. Handling is a term that includes agility and stability. The agility refers to characteristic of quickly controlling a vehicle in response to changes in the external environment. The stability refers to characteristic of maintaining the control state of the vehicle in spite of changes in the external environment. In general, the agility and stability have a conflicting relationship. Therefore, in order to harmonize agility and stability, a function to control AYC is required.

The performance of an Anti-lock Braking System (ABS), a Traction Control System (TCS), and a Vehicle Dynamics Control (VDC) depends on indirect information about tires, road friction, and tire characteristics. The indirect information is maintained from current lateral acceleration (Ay), longitudinal acceleration (Ax), yaw rate, and wheel speed. Road adhesion cannot be measured directly using a typical sensor setup. In general, estimated slip and slip-slope are used to calculate peak tire force in longitudinal dynamics applications. Currently, information on lateral acceleration is used to adjust the degree of intervention in lateral dynamics intervention.

The tire characteristics may be changed rapidly while accelerating into corners. Changes in tire characteristics can degrade the performance of TCS and VDC interventions. Due to the degradation of TCS, under low tire road adhesion conditions, acceleration in tight corners may cause power-induced understeer. In the condition of low tire adhesion to the road surface, a friction coefficient value is small. Accordingly, in order to prevent excessive acceleration and slippage, a function for providing on-time information on the current tire adhesion to the road surface is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a vehicle stability control method performed by a vehicle stability control apparatus includes collecting steering information from a sensor of a vehicle, calculating a saturation index of a front axle of the vehicle or a rear axle of the vehicle using the steering information, and controlling an application of the vehicle based on the saturation index.

The steering information may include a yaw rate, a steering wheel angle, a wheel speed, and a lateral acceleration.

The calculating may include calculating the saturation index of the rear axle of the vehicle, and the controlling may include adjusting intervention of an Electronic Stability Control (ESC) or Rear Wheel Steering (RWS) based on the saturation index of the rear axle.

The controlling may include controlling the RWS as a master actuator when the saturation index of the rear axle is lower than a reference index and controlling the ESC as the master actuator when the saturation index of the rear axle is higher than the reference index.

The calculating may include determining whether the front axle is saturated by using a slip angle and a slip angular velocity of a front wheel tire, and determining whether the rear axle is saturated by using a slip angle and a slip angular velocity of a rear wheel tire, and the controlling may include controlling an Active Yaw Control (AYC) for adjustment between agility intervention and stabilizing intervention using the saturation index.

The controlling may include activating agility intervention when the rear axle is within a stable region and the front axle is out of the stable region, and controlling the AYC to deactivate the agility intervention when the front axle enters the stable region.

The controlling may include controlling the AYC to reduce the agility intervention when the rear axle is out of the stable region.

The controlling may include controlling the AYC to expand the stabilization intervention when the rear axle is out of the stable region.

The method may include estimating a maximum road friction coefficient using the steering information; storing the maximum road friction coefficient; and updating the maximum road friction coefficient in response to a reset condition being satisfied.

In another general aspect, a vehicle stability control apparatus includes: a data collector configured to collect steering information from a sensor of a vehicle, a calculator configured to calculate a saturation index of a front axle of the vehicle or a rear axle of the vehicle using the steering information, and a controller configured to control an application of the vehicle based on the saturation index.

The calculator may calculate the saturation index of the rear axle of the vehicle, and the controller may be configured to adjust intervention of an Electronic Stability Control (ESC) or Rear Wheel Steering (RWS) based on the saturation index of the rear axle.

The calculator may be configured to determine whether the front axle is saturated using a slip angle and a slip angular velocity of a front wheel tire and whether the rear axle is saturated using a slip angle and a slip angular velocity of a rear wheel tire, and the controller may be configured to control an Active Yaw Control (AYC) for adjustment between agility intervention and stabilization intervention using the saturation index.

The controller may be configured to control the AYC to activate agility intervention when the rear axle is within a stable region and the front axle is out of the stable region, and to deactivate the agility intervention when the front axle enters the stable region.

The vehicle stability control apparatus may include: an estimator configured to estimate a maximum road surface friction coefficient using the steering information; a storage configured to store the maximum road friction coefficient; and an update unit configured to update the maximum road friction coefficient in response to a reset condition being satisfied.

Other features and aspects will be apparent from the following detailed description, the drawings, and the claims.

DESCRIPTION OF EXEMPLARY EMBODIMENTS

Figure 1:
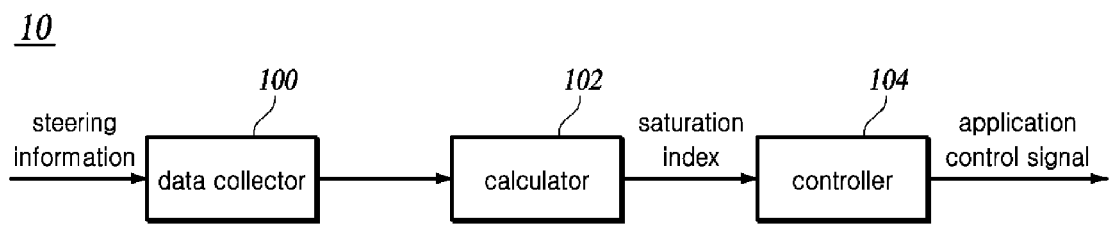
FIG. 1 is a block diagram illustrating each configuration included in a vehicle stability control apparatus according to one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The detailed description set forth below in conjunction with the appended drawings is intended to describe exemplary embodiments of the present disclosure and is not intended to represent the only embodiments in which the present disclosure may be practiced.

The vehicle stability control method and apparatus according to one embodiment may control Rear Wheel Steering (RWS)or an Electronic Stability Control (ESC) based on a saturation index of a rear axle.

The vehicle stability control method and apparatus according to one embodiment may control an Active Yaw Control (AYC) based on whether a front axle or a rear axle is saturated.

The vehicle stability control method and apparatus according to one embodiment may monitor the maximum friction coefficient of a road surface.

The problems to be solved by the present invention are not limited to the problems mentioned above, and other problems not mentioned will be clearly understood by those skilled in the art from the following description.

FIG. 1 is a block diagram illustrating each configuration included in a vehicle stability control apparatus according to one embodiment of the present disclosure.

A vehicle stability control apparatus 10 according to one embodiment of the present disclosure includes all or some of a data collector 100, a calculator 102, and a controller 104. The vehicle stability control apparatus 10 illustrated in FIG. 1 is according to one embodiment of the present disclosure and all blocks illustrated in FIG. 1 are not essential components, and in another embodiment, some blocks included the vehicle stability control apparatus 10 may be added, changed, or deleted. For example, the vehicle stability control apparatus 10 may further include an estimator (not illustrated) which estimates a maximum road friction coefficient using steering information, a storage (not illustrated) which stores the estimated maximum road friction coefficient, and an update unit which updates the maximum road friction coefficient in response to a preset reset condition being satisfied. The vehicle stability control apparatus 10 can improve performance of a Traction Control System (TCS) by maintaining the estimated maximum road friction coefficient as long as the reset condition is not satisfied.

The data collector 100 collects steering information from a sensor of the vehicle. Here, the steering information includes a yaw rate, a steering wheel angle, a wheel speed, and a lateral acceleration. The sensors for collecting the yaw rate, steering wheel angle, wheel speed, and lateral acceleration are common in a technical field related to an electrical field of the vehicle, and detailed descriptions thereof will be omitted.

The calculator 102 calculates a saturation index of a front axle or a rear axle using the steering information. The calculator 102 calculates the saturation index based on a phase plane of the axle. An operation of the calculator 102 will be described later through embodiments of the present disclosure.

The controller 104 controls an application of the vehicle based on the saturation index. Here, the controller 104 generates an application control signal and controls the application using the generated control signal. Here, the applications of the vehicle include ESC, RWS, AYC and TCS. However, the application of the vehicle controlled by the controller 104 is not limited thereto.

First Embodiment

The controller 104 adjusts intervention of the ESC or RWS based on the saturation index of the rear axle. The controller 104 controls the RWS as a master actuator when the saturation index is lower than a preset reference index. The controller 104 controls the ESC as the master actuator when the saturation index is higher than the reference index.

Figure 2:
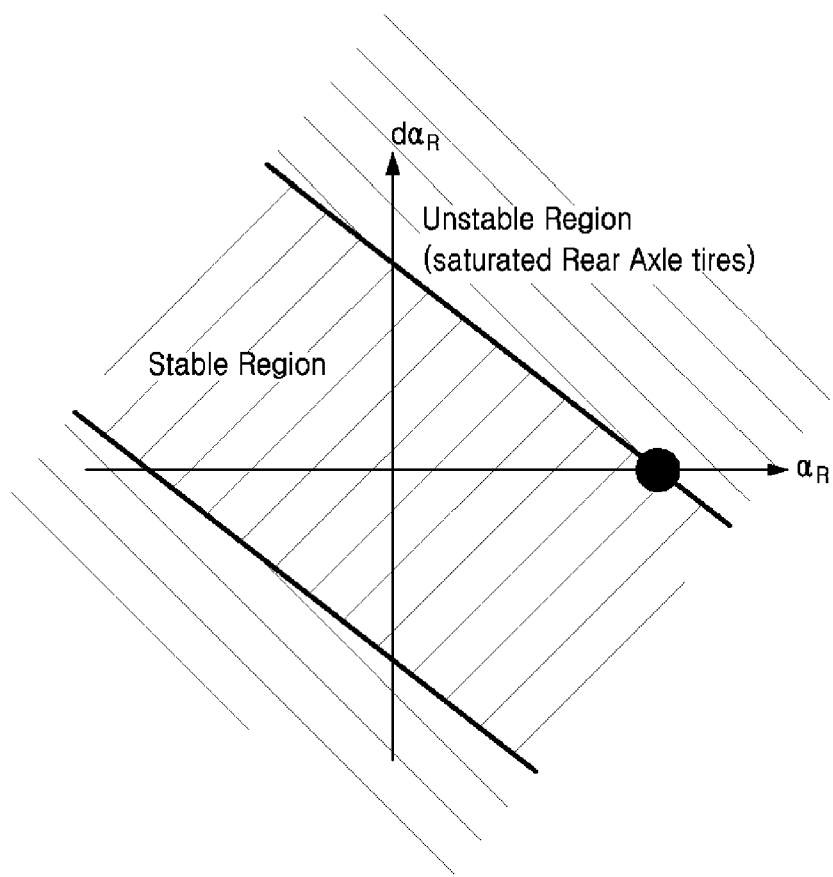
FIG. 2 is an exemplary diagram illustrating a phase plane based on a rear wheel side slip used by the vehicle stability control apparatus according to one embodiment of the present disclosure.

FIG. 2 is an exemplary diagram illustrating a phase plane based on a rear wheel side slip used by the vehicle stability control apparatus according to one embodiment of the present disclosure.

The vehicle stability control apparatus 10 assumes that the rear axle does not exceed a lateral stability margin during the RWS intervention.

The present disclosure provides a novel method for estimating a lateral stability index of a vehicle and an apparatus therefor. The vehicle stability control apparatus 10 according to the present disclosure uses the phase plane to estimate the lateral stability index. The vehicle stability control apparatus 10 may use the lateral stability index as a supervisory rule for the RWS operation. The vehicle stability control apparatus 10 may use the lateral stability index as a supervisory rule for mediation between the RWS and the ESC.

Referring to FIG. 2, a phase plane having a slip angle $\alpha_R$ of the rear axle as an x-axis and a slip angular velocity $d\alpha_R$ as a y-axis is illustrated. The vehicle stability control apparatus 10 uses the phase plane based on a rear axle lateral-slip angle and a rear axle lateral-slip angle velocity. Since the phase plane based on a physical quantity of the rear axle has never been used for vehicle dynamics applications, the vehicle stability control apparatus 10 provides a new vehicle control method.

Figure 3:
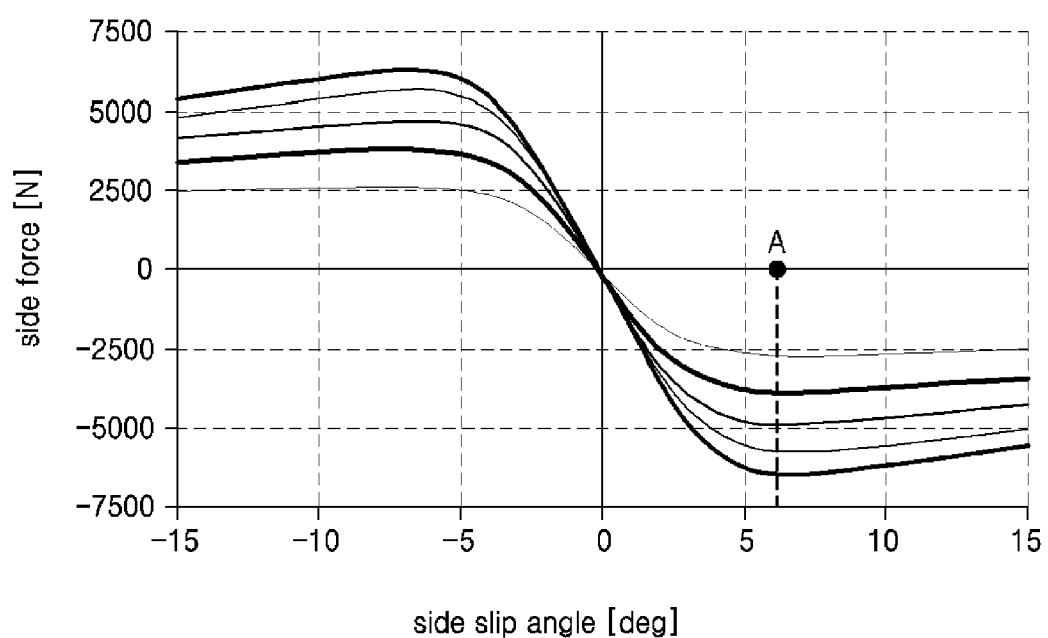
FIG. 3 is an exemplary diagram illustrating a relationship between a side slip angle and a side force according to one embodiment of the present disclosure.

FIG. 3 is an exemplary diagram illustrating a relationship between a side slip angle and a side force according to one embodiment of the present disclosure.

Referring to FIG. 3, the tire side force illustrates a linear characteristic in a section where the side slip angle is small. However, the tire side force illustrates a non-linear characteristic in the section where the side slip angle is large. Moreover, the tire side force is proportional to a vertical load acting on the tire. The phase plane can be directly linked to a working point for rear wheel tire characteristics. Accordingly, the phase plane of the present disclosure is a physical representation of vehicle stability associated with RWS intervention. The vehicle stability control apparatus 10 may determine two different regions on the phase plane based on the physical quantity of the rear axle. The regions determined by the vehicle stability control apparatus 10 include a stable region and an unstable region. The stable region means the region in which the rear wheel tire is not saturated. That is, the stable region is a region in which the rear wheel tire lateral slip is still small and does not increase rapidly. The unstable region means the region in which the rear wheel tire is saturated. That is, the unstable region is a region in which the rear wheel tire lateral slip is large or is about to increase.

The stable region and the unstable region are largely independent of a steering angle, a velocity, and a road friction. Accordingly, there is an advantage that the vehicle stability control apparatus 10 can be more easily tuned as compared to other stability estimation methods. Meanwhile, the method of dividing the phase plane into a stable region and an unstable region is not limited to FIG. 2. A classification index for classifying the stable region and the unstable region may be variously changed according to one embodiment of the present disclosure. Different methods of dividing the phase plane mainly affect only indirect factors such as the smoothness of the saturation index.

In a state in which the phase plane is defined, when the stable region and the unstable region are divided, the vehicle stability control apparatus 10 may derive the rear axle stability index. Here, the rear axle stability index may correspond to a rear wheel tire saturation index. In the stable region where the rear wheel tire saturation index is low, the vehicle control method regards the RWS as the master actuator, and the RWS can be used without restrictions. In the unstable region in which the rear wheel tire saturation index is high, the vehicle control method regards the ESC as the master actuator. The vehicle control method shall not use the RWS in unstable regions and shall not use the RWS together with a safety default strategy. Here, the safety default strategy involves returning to a freeze or align position. Since all RWS operations are allowed in the stable region, the present disclosure is not limited to a specific RWS control, and is valid for any selected RWS algorithm.

A control logic to drive for fun obviously tends to destabilize the vehicle. The control logic that destabilizes the vehicle leads to earlier reaching the unstable region, thus increasing a scale of the ESC intervention. Meanwhile, the control logic, which tends to minimize the rear axle saturation, reduces movement into the unstable region, thus reducing reliance on the ESC.

The vehicle stability control apparatus 10 controls the RWS in two ways. In one embodiment, the vehicle stability controller 10 provides physical and easy-tunable boundaries to allow for the RWS intervention. In another embodiment, the vehicle stability control apparatus 10 provides a simple coordination strategy between the RWS and the ESC. The coordination strategy provided by the vehicle stability control system 10 uses the potential of the RWS for performance and customization. At the same time, the coordination strategy does not interfere with the vehicle stability provided by the ESC.

Second Embodiment

The calculator 102 determines whether the front axle is saturated using the slip angle and the slip angular velocity of the front wheel tire. The calculator 102 determines whether the rear axle is saturated using the slip angle and the slip angular velocity of the rear wheel tire.

The controller 104 controls the AYC to adjust between the agility intervention and the stabilization intervention based on whether the front axle or the rear axle is saturated. The controller 104 activates the agility intervention when the rear axle is within the stable region and the front axle is out of the stable region. The controller 104 controls the AYC to deactivate the agility intervention when the front axle enters the stable region. The controller 104 controls the AYC to reduce the agility intervention when the rear axle is out of the stable region. The controller 104 controls the AYC to expand the stabilization intervention when the rear axle is out of the stable region.

The vehicle stability control apparatus 10 controls the activation or deactivation of AYC. The vehicle stability controller 10 may plan and adjust a ratio between agility of AYC and stabilizing of AYC. The vehicle stability control apparatus 10 may reduce a yaw control intervention based on the adjusted ratio.

The vehicle stability control apparatus 10 describes an area of loss of lateral grip of the front and rear axles, and it is premised that understeer and oversteer can be explained and detected. The area of loss of lateral grip is induced by the tire characteristics. The vehicle stability control apparatus 10 should estimate the lateral stability margin of the front axle or the rear axle for handling of the vehicle.

The vehicle stability control apparatus 10 may estimate the lateral stability margin by evaluating a cause or a result of any one of the oversteer and understeer. For example, the cause of the oversteer or understeer may be tire saturation. The result of the oversteer or understeer may be a yaw rate error.

The vehicle stability control apparatus 10 provides a novel method for estimating a loss of a front axle lateral grip or proximity to the loss using a phase portrait for estimating a lateral saturation index with respect to the front axle, to prevent loss or loss of front axle lateral grip. The loss of the front axle lateral grip generates the understeer. The vehicle stability control apparatus 10 determines the saturation index for the rear axle by using a tire slip angle $(\alpha_{RA}, \dot{\alpha}_{RA})$ phase trajectory of the rear axle. The vehicle stability control apparatus 10 integrates three separate functions into one solution using both phase trajectories together. The vehicle stability control apparatus 10 provides the following advantages compared to the conventional AYC activation and adjustment method. The vehicle stability control apparatus 10 provides a direct physical analysis of tire saturation using the phase trajectory. The vehicle stability control apparatus 10 simultaneously describes the understeer and oversteer, and a combination of the understeer and oversteer. The vehicle stability control apparatus 10 may smoothly adjust any one of the understeer and oversteer at the same time. The vehicle stability control apparatus 10 can operate before leaving saturation boundaries, thereby alleviating the need for conventional harsh ESC intervention. The phase trajectory includes the slip angle $\alpha_{FA}$ and the slip angular velocity $\dot{\alpha}_{FA}$ of the front axle of the vehicle. The $(\alpha_{RA}, \dot{\alpha}_{RA})$ phase plane has a direct physical link to the working point of the front axle tire characteristics. The $(\alpha_{RA}, \dot{\alpha}_{RA})$ phase plane allows the quantification of the saturation level. Since the $(\alpha_{RA}, \dot{\alpha}_{RA})$ phase plane has not been previously used in vehicle dynamics applications, the vehicle control method performed by the vehicle stability control apparatus 10 is a new technology different from the prior art.

The vehicle stability control apparatus 10 may use the $(\alpha_{RA}, \dot{\alpha}_{RA})$ and/or the $(\alpha_{RA}, \dot{\alpha}_{RA})$ phase plane together with a longitudinal slip X to account for the reduced lateral force potential in the case of additional longitudinal acceleration or longitudinal deceleration.

The vehicle stability control apparatus 10 quantifies the saturation from the phase plane. The vehicle stability control apparatus 10 divides the phase planes for the front axle and the rear axle into three separate regions, and assigns an SI value to each region. The SI value may be the saturation index of the front axle or the rear axle. A region in which the front and rear wheel tires are not yet saturated may be referred to as a linear region. That is, the linear region means a region where the tire lateral slip is still small and does not increase rapidly. The vehicle stability control apparatus 10 assigns 0 as the SI value for the linear region. A region in which the front and rear wheel tires deviate from or are about to deviate from the linear region may be referred to as an intermediate region. That is, the intermediate region means a region in which the tire lateral slip is close to saturation. The vehicle stability control apparatus 10 assigns a real number between 0 and 1 as the SI value for the intermediate region. A region in which the front and rear wheel tires are saturated, that is, a region in which the tire lateral slip is large or is about to become large, may be referred to as a saturated region. The vehicle stability control apparatus 10 assigns a real number of 1 or more as the SI value for the saturated region. Table 1 illustrates SI values according to the tire saturation.

TABLE 1

| Tire saturation | SI value |
| --- | --- |
| Linear region | SI = 0 |
| Intermediate region | 0 < SI < 1 |
| Saturated region | SI ≥ 1 |

Since the regions on the phase plane are largely independent from the steering angle, the velocity, and the road friction, the vehicle stability control apparatus 10 may perform tuning more easily compared to other stability estimation methods.

The vehicle stability control apparatus 10 may coordinate the AYC intervention. When the axle saturation index of each of the front and rear axles is defined, the vehicle stability control apparatus 10 may plan activation, deactivation, and adjustment for agility and stabilization of the AYC intervention. As soon as the rear axle is within the stability region and the front axle is out of the linear region or enters the unstable region, the vehicle stability control apparatus 10 may activate the AYC to improve the yaw speed or intervention to alleviate understeer. The stable region of the rear axle is a region in which a SIRA value is 0. The region when the front axle is out of the linear region or enters the unstable region is a region in which the SIFA value is 0 or more. The activation of the AYC for improving the yaw speed is intervention for the agility of the vehicle, and the vehicle stability control apparatus 10 may perform, for example, torque vectoring (TV). The agility intervention may also be referred to as understeer interventions. The vehicle stability control apparatus 10 may perform, for example, inner wheel braking or engine torque reduction to alleviate the understeer. During the agility intervention, as soon as the rear axle is out of the stable region, the vehicle stability control apparatus 10 may reduce the agility intervention until the deactivation is realized. The region in which the rear axle is out of the stable region is the region in which the SIRA value is greater than zero. As soon as the front axle again enters the stable region, the vehicle stability control apparatus 10 may deactivate the agility intervention or intervention to alleviate the understeer. Here, the stable region may be referred to as a linear region. When the rear axle is out of the stable region, the vehicle stability control apparatus 10 may expand and adjust the AYC intervention for correction and stabilization until the activation is fully realized. The region when the rear axle is out of the stable region is the region in which the SIRA value is greater than 0. The vehicle stability control apparatus 10 may perform an expanded adjustment of the stabilization intervention in parallel with a reduced adjustment of the agility intervention.

Since all agility AYC actions are permitted within the stability region of the rear axle, the agility intervention according to the present disclosure is not limited to the AYC intervention by specific conditions. A high yaw torque obviously tends to make the vehicle unstable. The high yaw torque causes the unstable region to be reached earlier, so it is scaled down earlier. Since the side force saturation on the front axle may occur during active agility intervention, the vehicle stability controller 10 may control the AYC to prevent the side force saturation of the front axle.

The vehicle stability control apparatus 10 may control vehicle dynamics by providing a simple blending strategy between the agility and stability. The blending strategy uses the potential of the AYC for performance and customization. The blending strategy provided by the vehicle stability control apparatus 10 allows operations to be performed before exiting the saturation boundary, thus alleviating the need for harsh ESC intervention.

Third Embodiment

The estimator estimates the maximum road friction coefficient using the steering information.

The storage stores the estimated maximum road friction coefficient.

The update unit updates the maximum road friction coefficient in response to a preset reset condition being satisfied.

In order to overcome the limitations of the conventional mu estimation method, the vehicle stability control apparatus 10 monitors the stability margins of the front and rear axles, and stores the maximum values of the detected acceleration and the estimated force. The estimated maximum value is reduced only when a condition indicating the loss of the tire stability margin or the proximity to the loss is detected.

The vehicle stability control apparatus 10 provides the following advantages. Since a feed forward application can be disclosed by an adhesive collected during the current operation, it is more likely to be the actual road friction level. The vehicle stability control apparatus 10 may detect a change in road adhesion at the same time or before the ESC needs to adjust the adhesion. Moreover, the vehicle control method performed by the vehicle stability control apparatus 10 is simple and robust, and can be adjusted with little effort.

The vehicle stability control apparatus 10 monitors stability margins of the front axle FA and the rear axle RA using the tire slip angles ($\alpha_{FA}$, $\dot{\alpha}_{FA}$) and the ($\alpha_{RA}$, $\dot{\alpha}_{RA}$) and the phase trajectories. The side slip ($\beta,\dot{\beta}$) phase plane is commonly known and used in vehicle dynamics applications such as stability, intervention thresholds and intervention margins evaluation. Meanwhile, the tire slip angle phase plane provides a direct physical link to the operating point of the tire, enabling direct evaluation of the stability margin. The tire characteristics generally change with road friction, but the saturated region is almost independent of the road friction as well as the steering angle and the speed. Accordingly, the vehicle stability control apparatus 10 has the advantage that tuning is easier. The vehicle stability control apparatus 10 calculates the saturation index for both axles by using the tire slip angle phase plane. The vehicle stability control apparatus 10 defines a saturation index SI value for each region together with the saturated region in which the boundary is set.

The region in which the front axle and the rear axle are not saturated may be referred to as the linear region. That is, the linear region means a region where the tire lateral slip is still small and does not increase rapidly. The linear region may also be referred to as the stable region. The vehicle stability control apparatus 10 assigns 0 as the SI value for the linear region. The region in which the front axle and the rear axle deviate or are about to deviate from the linear region may be referred to as the intermediate region. That is, the intermediate region means a region in which the tire lateral slip is close to saturation. The vehicle stability control apparatus 10 assigns a real number between 0 and 1 as the SI value for the intermediate region. The region in which the front axle and the rear axle are saturated, that is, the region in which the tire lateral slip is large or is about to become large, may be referred to as the unstable region. The vehicle stability control apparatus 10 assigns a real number of 1 or more as the SI value for the unstable region.

Figure 4:
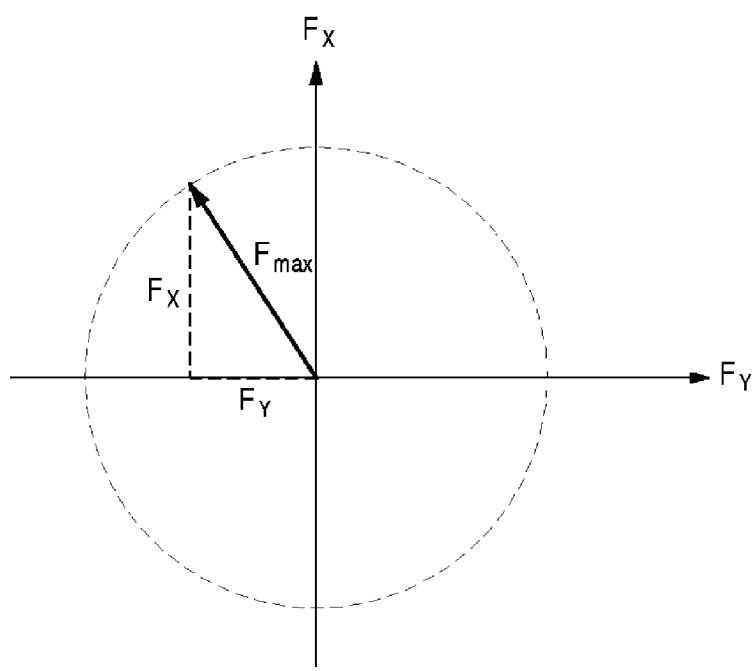
FIG. 4 is an exemplary view illustrating a Kamm's friction circle used by the vehicle stability control apparatus according to one embodiment of the present disclosure.

FIG. 4 is an exemplary view illustrating a Kamm's friction source used by the vehicle stability control apparatus according to one embodiment of the present disclosure.

Figure 5:
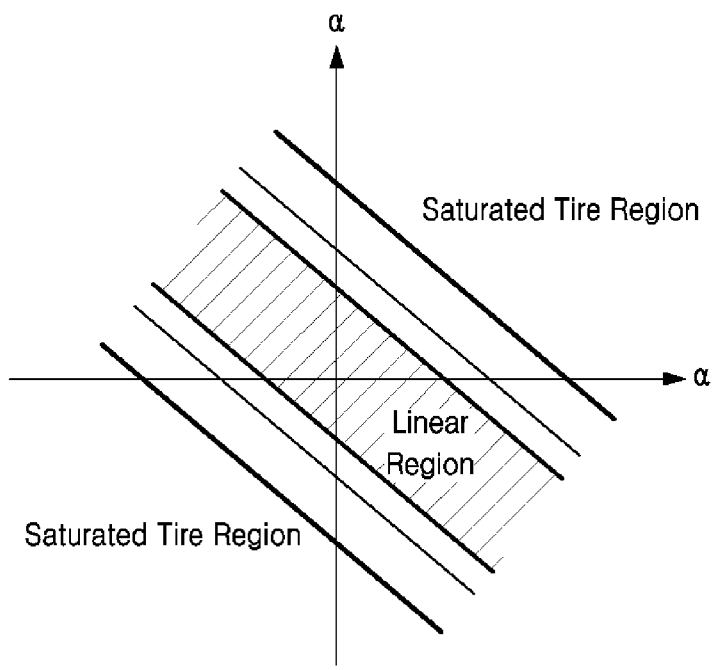
FIG. 5 is an exemplary diagram illustrating a phase plane based on tire slip used by the vehicle stability control apparatus according to one embodiment of the present disclosure.

FIG. 5 is an exemplary diagram illustrating the phase plane based on the tire slip used by the vehicle stability control apparatus according to one embodiment of the present disclosure.

Referring to FIG. 4, the Kamm's friction circle based on longitudinal and lateral forces is illustrated. The principle of Kamm's friction circle is that the resultant force of the friction force on the tire does not exceed the sum of a lateral force vector and a longitudinal force vector.

Referring to FIG. 5, the phase plane based on the tire slip is illustrated. The phase trajectory can capture saturation due to lateral dynamics, whereas a single wheel tire slip is used to account for saturation due to acceleration and braking. In the principle of using the Kamm's friction circle, the tire slip λ may also be included in the phase plane by narrowing the linear region.

The vehicle stability control apparatus 10 stores the detected and estimated maximum friction coefficient in one ignition cycle until the reset condition is satisfied. The reset condition means to decrease the stored value to the maximum level of the current sensed or estimated coefficient of friction. However, the reset condition may be variously changed according to one embodiment of the present disclosure.

Through empirical testing, a reset case including the following conditions may be set. The reset condition means that the slip level of the driven axle exceeds a preset threshold, or the front axle is saturated and the rear axle is close to the saturation. When the SI value of the front axle exceeds 1, the front axle becomes saturated. When the SI value of the rear axle is greater than zero, the rear axle approaches the saturation state.

The vehicle stability control apparatus 10 determines the current road friction level by combining the force according to the Kamm's friction circle with the sensed or estimated axial acceleration at the vehicle level. The vehicle stability control apparatus 10 stores the maximum friction coefficient until the reset condition is satisfied.

Figure 6:
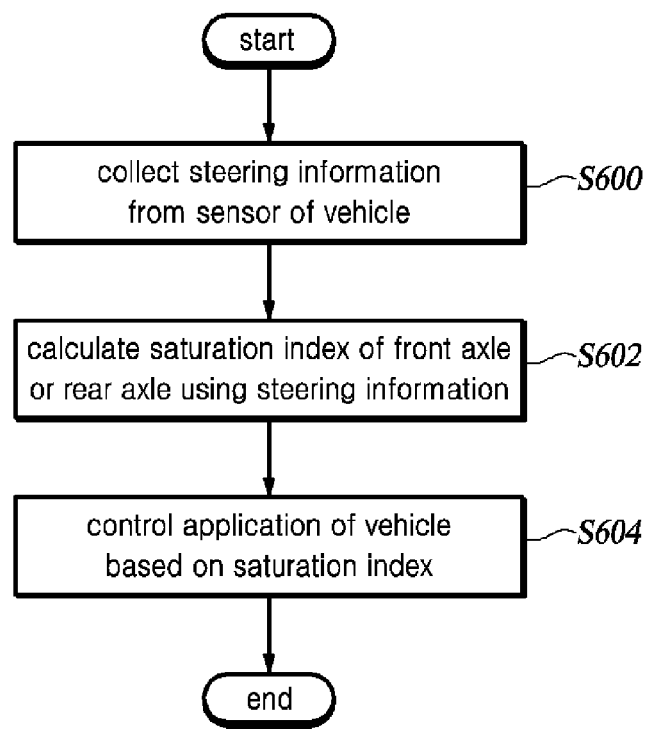
FIG. 6 is a flowchart for explaining each process included in a vehicle stability control method performed by the vehicle stability control apparatus according to one embodiment of the present disclosure

FIG. 6 is a flowchart for explaining each process included in the vehicle stability control method performed by the vehicle stability control apparatus according to one embodiment of the present disclosure.

The vehicle control apparatus 10 collects steering information from the sensor of the vehicle (S600).

The vehicle control apparatus 10 calculates the saturation index of the front axle or the rear axle using the steering information (S602).

The vehicle control apparatus 10 controls the application of the vehicle based on the saturation index (S604).

Figure 7:
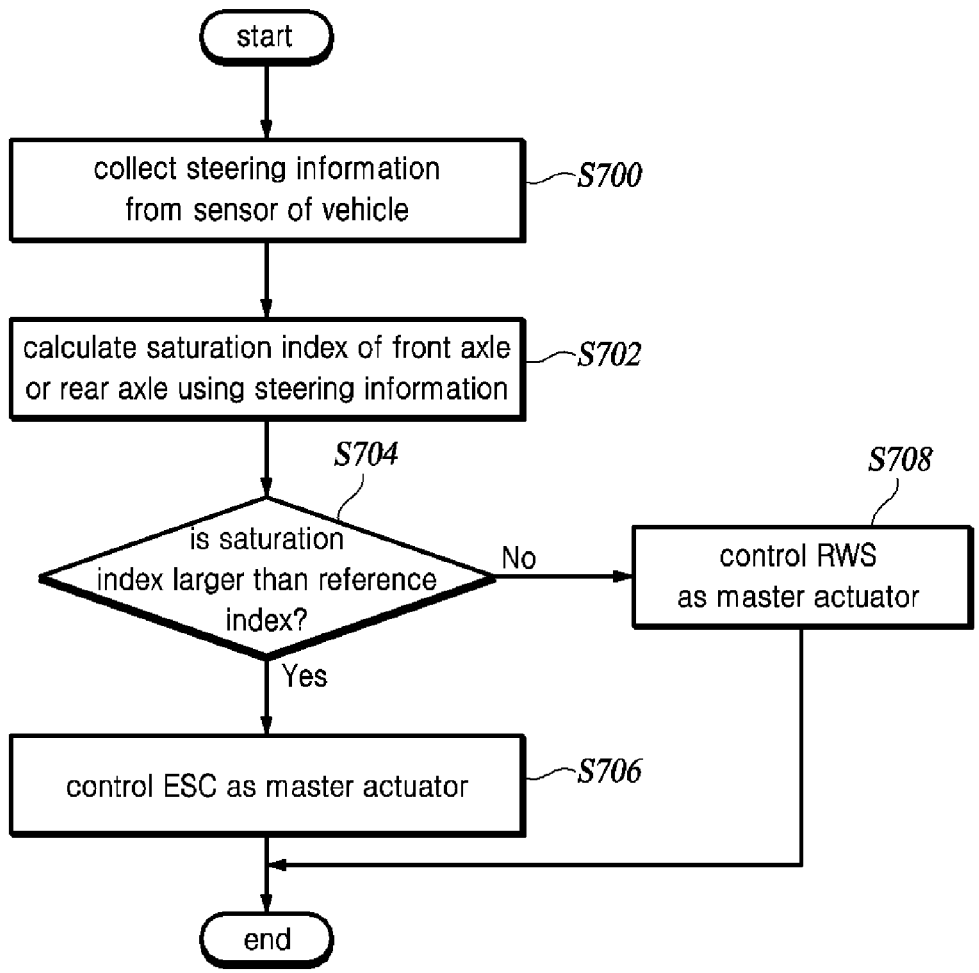
FIG. 7 is a flowchart for explaining a process of adjusting Electronic Stability Control (ESC) or Rear Wheel Steering (RWS) intervention included in the vehicle stability control method according to one embodiment of the present disclosure.

FIG. 7 is a flowchart for explaining a process of adjusting the ESC or RWS intervention included in the vehicle stability control method according to one embodiment of the present disclosure.

The vehicle control apparatus 10 collects the steering information from the sensor of the vehicle (S600).

The vehicle control apparatus 10 calculates the saturation index of the front axle or the rear axle using the steering information (S602).

The vehicle control apparatus 10 controls the RWS as a master actuator when the saturation index is lower than the preset reference index (S700, S702), and controls the ESC as the master actuator when the saturation index is higher than the reference index (S700, S704).

Figure 8:
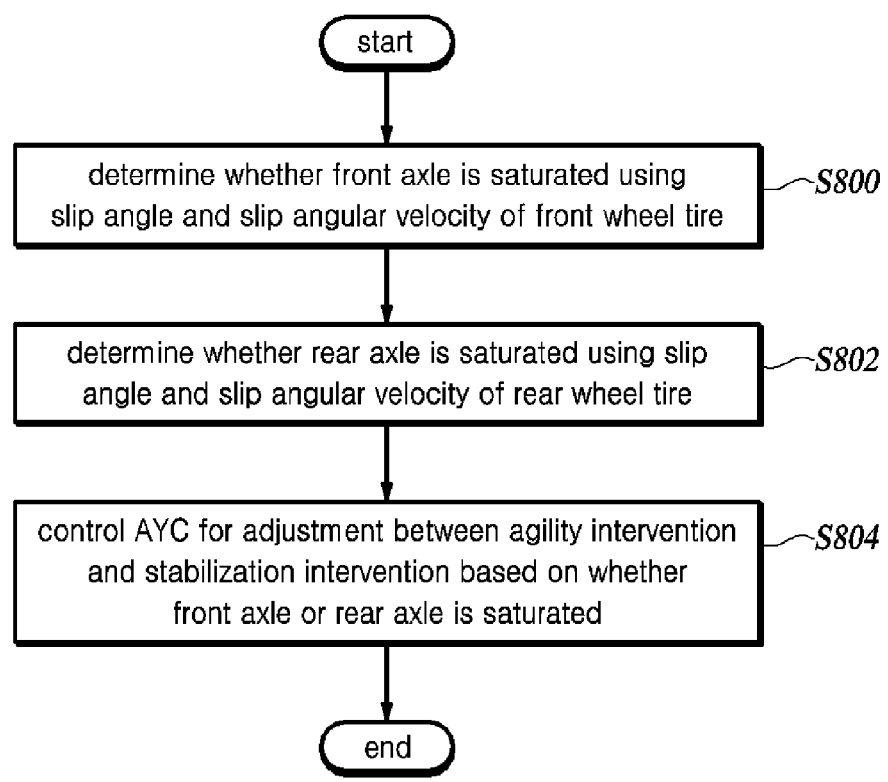
FIG. 8 is a flowchart for explaining a process of controlling an Active Yaw Control (AYC) included in the vehicle stability control method according to one embodiment of the present disclosure.

FIG. 8 is a flowchart for explaining a process of controlling the AYC included in the vehicle stability control method according to one embodiment of the present disclosure.

The vehicle control apparatus 10 determines whether the front axle is saturated using the slip angle and the slip angular velocity of the front wheel tire (S800).

The vehicle control apparatus 10 determines whether the rear axle is saturated using the slip angle and slip angular velocity of the rear wheel tire (S802).

The vehicle control apparatus 10 controls the AYC for adjustment between the agility intervention and the stabilization intervention based on whether the front axle or the rear axle is saturated (S804).

Figure 9:
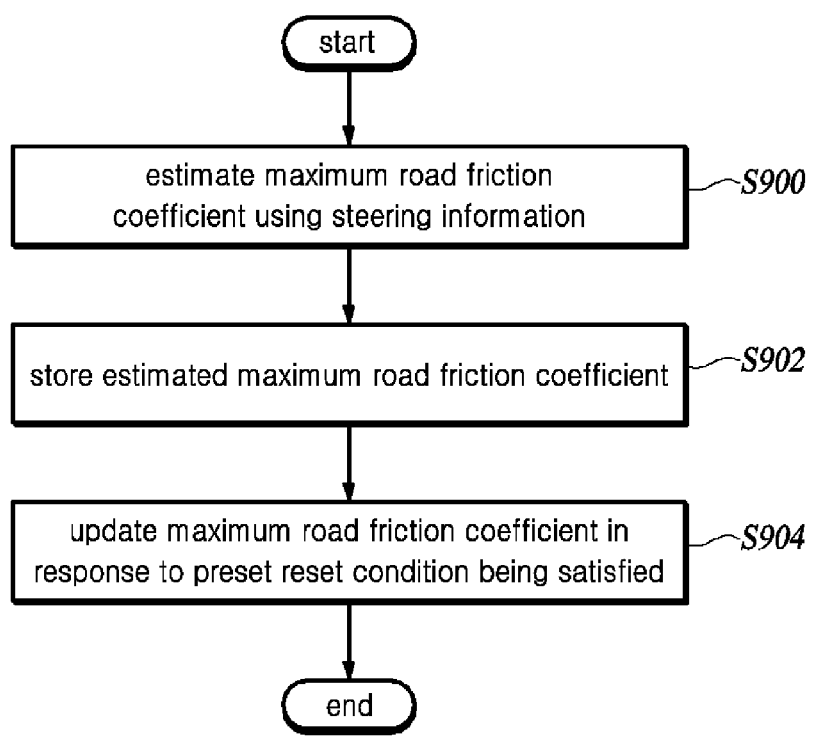
FIG. 9 is a flowchart illustrating a process of monitoring a road friction coefficient included in the vehicle stability control method according to one embodiment of the present disclosure.

FIG. 9 is a flowchart illustrating a process of monitoring the road friction coefficient included in the vehicle stability control method according to one embodiment of the present disclosure.

The vehicle control apparatus 10 estimates the maximum road friction coefficient using the steering information (S900).

The vehicle control apparatus 10 stores the estimated maximum road friction coefficient (S902).

The vehicle control apparatus 10 updates the maximum road friction coefficient in response to a preset reset condition being satisfied (S904).

According to one embodiment, it is possible to adjust the operation between the RWS and the ESC in response to the saturation of the rear axle.

According to one embodiment, it is possible to control the AYC to adjust the intervention between the agility and stability of the vehicle.

According to one embodiment, it is possible to improve the performance of the TCS by monitoring the friction coefficient of the road surface.

Effects of the present disclosure are not limited to the effects mentioned above, and other effects not mentioned will be clearly understood by those skilled in the art from the description below.

Although the flowchart describes that each process is sequentially executed, this is merely illustrative of the technical idea of some embodiments of the present invention. In other words, those of ordinary skill in the art to which some embodiments of the present invention pertain may change and execute the processes described in the flowchart without departing from the essential characteristics of some embodiments of the present invention, or may apply various modifications and variations to parallel execution of one or more of each process, and thus, the flowchart is not limited to a chronological order.

Various implementations of the apparatus and methods described herein may include digital electronic circuits, integrated circuits, Field Programmable Gate Arrays (FPGAs), Application Specific Integrated Circuits (ASICs), computer hardware, firmware, software, and/or combinations thereof. These various implementations may include being implemented in one or more computer programs executable on a programmable system. The programmable system includes at least one programmable processor (which may be a special purpose processor or may be a general-purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable medium".

The computer-readable recording medium includes all types of recording devices in which data readable by a computer system is stored. These computer-readable recording media may further include non-volatile or non-transitory such as a ROM, a CD-ROM, a magnetic tape, a floppy disk, a memory card, a hard disk, a magneto-optical disk, and a storage device, or a transitory medium such as a data transmission medium. In addition, the computer-readable recording medium may be distributed in a network-connected computer system, and the computer-readable code may be stored and executed in a distributed manner.

Various implementations of the apparatus and methods described herein may be implemented by a programmable computer. Here, the computer includes a programmable processor, a data storage system (including volatile memory, non-volatile memory, or other types of storage systems or combinations thereof), and at least one communication interface. For example, a programmable computer may be one of a server, a network appliance, a set-top box, an embedded device, a computer expansion module, a personal computer, a laptop, a Personal Data Assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A vehicle stability control method performed by a vehicle stability control apparatus, the method comprising:
   collecting steering information from a sensor of a vehicle;
   calculating a saturation index of a front axle of the vehicle or a rear axle of the vehicle using the steering information; and
   controlling an application of the vehicle based on the saturation index,
   wherein the calculating includes determining whether the front axle is saturated by using a slip angle and a slip angular velocity of a front wheel tire, and determining whether the rear axle is saturated by using a slip angle and a slip angular velocity of a rear wheel tire, and
   wherein the controlling includes controlling an Active Yaw Control (AYC) for adjustment between agility intervention and stabilizing intervention using the saturation index.

2. The vehicle stability control method of claim 1, wherein the steering information includes a yaw rate, a steering wheel angle, a wheel speed, and a lateral acceleration.

3. The vehicle stability control method of claim 2, further comprising:
   estimating a maximum road friction coefficient using the steering information;
   storing the maximum road friction coefficient; and
   updating the maximum road friction coefficient in response to a reset condition being satisfied.

4. The vehicle stability control method of claim 1, wherein the controlling includes activating agility intervention when the rear axle is within a stable region and the front axle is out of the stable region, and controlling the AYC to deactivate the agility intervention when the front axle enters the stable region.

5. The vehicle stability control method of claim 4, wherein the controlling includes controlling the AYC to reduce the agility intervention when the rear axle is out of the stable region.

6. The vehicle stability control method of claim 4, wherein the controlling includes controlling the AYC to expand the stabilization intervention when the rear axle is out of the stable region.

7. A vehicle stability control apparatus comprising:
   a data collector configured to collect steering information from a sensor of a vehicle;
   a calculator configured to calculate a saturation index of a front axle of the vehicle or a rear axle of the vehicle using the steering information; and
   a controller configured to control an application of the vehicle based on the saturation index,
   wherein the calculator is configured to determine whether the front axle is saturated using a slip angle and a slip angular velocity of a front wheel tire and whether the rear axle is saturated using a slip angle and a slip angular velocity of a rear wheel tire, and
   wherein the controller is configured to control an Active Yaw Control (AYC) for adjustment between agility intervention and stabilization intervention using the saturation index.

8. The vehicle stability control apparatus of claim 7, wherein the controller is configured to control the AYC to activate agility intervention when the rear axle is within a stable region and the front axle is out of the stable region, and to deactivate the agility intervention when the front axle enters the stable region.

9. The vehicle stability control apparatus of claim 7, further comprising:
   an estimator configured to estimate a maximum road surface friction coefficient using the steering information;
   a storage configured to store the maximum road surface friction coefficient; and
   an update unit configured to update the maximum road surface friction coefficient in response to a reset condition being satisfied.

10. A vehicle stability control method performed by a vehicle stability control apparatus, the method comprising:
    collecting steering information from a sensor of a vehicle;
    calculating a saturation index of a front axle of the vehicle or a rear axle of the vehicle using the steering information; and
    controlling an application of the vehicle based on the saturation index,
    wherein the calculating includes calculating the saturation index of the rear axle of the vehicle, and the controlling includes adjusting intervention of an Electronic Stability Control (ESC) or Rear Wheel Steering (RWS) based on the saturation index of the rear axle, and
    wherein the controlling includes controlling the RWS as a master actuator when the saturation index of the rear axle is lower than a reference index and controlling the ESC as the master actuator when the saturation index of the rear axle is higher than the reference index.

* * * * *